United States Patent
Yang et al.

(10) Patent No.: US 11,108,098 B2
(45) Date of Patent: Aug. 31, 2021

(54) BATTERY MODULE HAVING HEAT CONDUCTION PAD

(71) Applicant: LG CHEM, LTD., Seoul (KR)

(72) Inventors: Seong-Hwan Yang, Daejeon (KR); Jin-Oh Yang, Daejeon (KR); Seog-Jin Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 254 days.

(21) Appl. No.: 16/238,804

(22) Filed: Jan. 3, 2019

(65) Prior Publication Data

US 2019/0214694 A1    Jul. 11, 2019

(30) Foreign Application Priority Data

Jan. 4, 2018 (KR) ........................ 10-2018-0001304

(51) Int. Cl.
  *H01M 10/655* (2014.01)
  *H01M 10/625* (2014.01)
  (Continued)

(52) U.S. Cl.
  CPC ....... *H01M 10/655* (2015.04); *H01M 10/613* (2015.04); *H01M 10/625* (2015.04); *H01M 10/643* (2015.04); *H01M 10/6553* (2015.04); *H01M 10/6554* (2015.04); *H01M 50/20* (2021.01); *H01M 50/502* (2021.01); *H01M 10/6556* (2015.04); *H01M 2220/20* (2013.01)

(58) Field of Classification Search
  CPC ............. H01M 10/613; H01M 10/625; H01M 10/643; H01M 10/6553; H01M 10/6554; H01M 2220/20; H01M 2/206; H01M 2/1077; H01M 10/123; H01M 10/124

USPC ........................................................ 429/120
  See application file for complete search history.

(56) References Cited

U.S. PATENT DOCUMENTS 8,916,278 B2   12/2014  Kim et al.
9,882,253 B1 *  1/2018  Tutzer ................. H01M 10/625
                        (Continued)

FOREIGN PATENT DOCUMENTS

EP    3 343 672 A1    7/2018
JP    2001-155702 A   6/2001
                (Continued)

*Primary Examiner* — Eli S Mekhlin
(74) *Attorney, Agent, or Firm* — Morgan, Lewis & Bockius LLP

(57) ABSTRACT

A battery module includes: a plurality of cylindrical battery cells each having electrode terminals respectively at an upper portion and a lower portion thereof; a module housing including an accommodation portion having hollow structures in which the cylindrical battery cells are inserted and accommodated; a current collecting plate on an outer surface of the module housing and including welding holes through which the electrode terminals of the cylindrical battery cells are exposed to the outside; a bus bar in contact with each of the electrode terminals and the current collecting plate to electrically connect the electrode terminals to the current collecting plate; and a heat conduction pad disposed outside the current collecting plate and including a contact protrusion portion protruding and extending in a direction in which the electrode terminals are disposed to be in contact with a contact connection portion between the electrode terminals and the bus bar.

11 Claims, 9 Drawing Sheets

(51) Int. Cl.
*H01M 10/613* (2014.01)
*H01M 10/6554* (2014.01)
*H01M 10/6553* (2014.01)
*H01M 10/643* (2014.01)
*H01M 50/20* (2021.01)
*H01M 50/502* (2021.01)
H01M 10/6556 (2014.01)

(56) References Cited

U.S. PATENT DOCUMENTS

| | | | |
|---|---|---|---|
| 10,847,775 B2 * | 11/2020 | Fees | B60K 1/00 |
| 2008/0008910 A1 | 1/2008 | Koh | |
| 2016/0218401 A1 * | 7/2016 | Hermann | H01M 10/627 |
| 2017/0194610 A1 | 7/2017 | Tschiggfrei et al. | |
| 2017/0214104 A1 | 7/2017 | Garfinkel et al. | |
| 2017/0231117 A1 * | 8/2017 | Yu | H05K 7/20809 |
| 2018/0269548 A1 | 9/2018 | Chi et al. | |
| 2019/0181400 A1 * | 6/2019 | Nakasawa | H01M 2/1235 |
| 2020/0321666 A1 * | 10/2020 | Kim | H01M 10/6563 |

FOREIGN PATENT DOCUMENTS

| | | |
|---|---|---|
| JP | 2009-295381 A | 12/2009 |
| KR | 10-0760784 B1 | 9/2007 |
| KR | 10-2011-0016821 A | 2/2011 |
| KR | 10-2016-0149285 A | 12/2016 |
| KR | 10-2017-0019041 A | 2/2017 |
| KR | 10-2017-0022371 A | 3/2017 |
| KR | 10-2017-0095052 A | 8/2017 |
| KR | 10-2017-0140693 A | 12/2017 |

\* cited by examiner

BATTERY MODULE HAVING HEAT CONDUCTION PAD

TECHNICAL FIELD

The present application claims priority to Korean Patent Application No. 10-2018-0001304 filed on Jan. 4, 2018 in the Republic of Korea, the disclosures of which are incorporated herein by reference.

The present disclosure relates to a battery module including a heat conduction pad, and more particularly, to a battery module having improved connection scalability and cooling efficiency and a battery pack including the same.

BACKGROUND ART

Secondary batteries are highly applicable to various product groups and have electrical characteristics with high energy density. Such secondary batteries are applied not only to portable electronic devices but also to electric vehicles, hybrid vehicles, and power storage devices, which are driven by electrical driving sources.

In addition, such secondary batteries are attracting attention as new energy sources for enhancing environmental friendliness and energy efficiency in that no by-products from the use of energy are generated, in addition to the primary advantage that can significantly reduce the use of fossil fuels.

A battery pack applied to an electric vehicle or the like has a structure in which a plurality of battery modules each including a plurality of battery cells as secondary batteries are connected so as to obtain high output. Each of the battery cells is an electrode assembly including a positive electrode, a negative current collector, a separator, an active material, and an electrolyte, and can perform repeated charge and discharge through electrochemical reaction between components.

Meanwhile, in recent years, a need for large capacity structures, including utilization as an energy storage source, has been increasing, and there is an increasing demand for a battery pack having a multi-module structure in which a plurality of battery modules each having a plurality of battery cells connected in series and/or in parallel are assembled.

Since a battery pack having a multi-expansion module structure is manufactured in such a manner that a plurality of battery cells are densely packed in a narrow space, it is important to easily discharge heat generated in each battery cell.

That is, the process of charging or discharging the battery cell generates heat by electrochemical reaction. Therefore, if the heat of the battery module generated during the charge and discharge process is effectively removed, heat accumulation may occur. In addition, deterioration of the battery module is promoted, and in some cases, ignition or explosion may occur. Therefore, in the related art, a high output large capacity battery module and a built-in cooling device for cooling battery cells are applied.

In addition, in the related art, in the case of a high rate discharge battery module, a plurality of battery cells are provided for high rate discharge.

However, when a plurality of battery cells are mounted in one battery module, the density of the battery cells is very high due to spatial limitation. Furthermore, since the heat value of such a battery cell increases in proportion to the square of the current, the temperature of the battery cell is likely to rise sharply during high rate discharge.

Therefore, there is a need for an effective cooling technique for enhancing the performance and lifespan characteristics of the battery module.

DISCLOSURE

Technical Problem

The present disclosure is designed to solve the problems of the related art, and therefore the present disclosure is directed to providing a battery module having improved connection scalability and cooling efficiency and a battery pack including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a plurality of cylindrical battery cells each having electrode terminals respectively formed at an upper portion and a lower portion thereof a module housing including an accommodation portion having a plurality of hollow structures in which the plurality of cylindrical battery cells are inserted and accommodated; a current collecting plate mounted on an outer surface of the module housing and including a plurality of welding holes through which the electrode terminals of the cylindrical battery cells are exposed to the outside; a bus bar in contact with each of the electrode terminals and the current collecting plate so as to electrically connect the electrode terminals to the current collecting plate; and a heat conduction pad disposed outside the current collecting plate and including a contact protrusion portion protruding and extending in a direction in which the electrode terminals are disposed, so as to be in contact with a contact connection portion between the electrode terminals and the bus bar.

Here, the bus bar may include: a terminal connection portion having a plate shape corresponding to an outer surface of the electrode terminal so as to be connected in contact with the electrode terminal of the cylindrical battery cell; a vertical extension portion extending upward or downward from the terminal connection portion so as to penetrate through the welding hole of the current collecting plate; and a plate connection portion bent and extended from an end of the vertical extension portion in a horizontal direction so as to be in contact with an outer surface of the current collecting plate.

In addition, a surface of the contact protrusion portion may be in contact with a plate-shaped outer surface of the terminal connection portion.

Furthermore, a horizontal side portion of the contact protrusion portion may be in contact with the vertical extension portion of the bus bar.

The heat conduction pad may include a main body portion disposed outside the current collecting plate and extending along the outer surface of the current collecting plate, an inner surface of the main body portion being in contact with the plate connection portion.

In addition, an inner side surface of the main body portion of the heat conduction pad may include an insertion groove which is recessed inward in an outward direction and in which the plate connection portion of the bus bar is inserted.

Furthermore, the battery module may further include a heat sink disposed so as to be in contact with an outer surface of the main body portion of the heat conduction pad.

A plurality of protrusion structures protruding in a direction in which the heat conduction pad is disposed may be formed on an inner surface of the heat sink.

In addition, a plurality of accommodation grooves into which the plurality of protrusions structures are inserted may be formed on the outer surface of the main body portion of the heat conduction pad.

Furthermore, the accommodation portion may include a cover structure protruding and extending in a direction in which the electrode terminals of the cylindrical battery cells are disposed, so as to cover an outer peripheral portion of an upper end surface or a lower end surface of the cylindrical battery cell.

In another aspect of the present disclosure, there is also provided a battery pack including at least one battery module according to the present disclosure.

Furthermore, in another aspect of the present disclosure, there is also provided a device including the battery pack according to the present disclosure.

Advantageous Effects

According to at least one of the embodiments of the present disclosure, since a heat conduction pad of a battery module is disposed on an upper surface of a first current collecting plate or a lower surface of a second current collecting plate, it is possible to effectively dissipate heat generated from the first current collecting plate, the second current collecting plate, and a bus bar.

Furthermore, a contact protrusion portion for contact-cooling a terminal connection portion of the bus bar having a relatively high electrical resistance in the battery module is formed on the heat conduction pad, thereby further enhancing the cooling effect of the battery module.

In addition, according to at least one of the embodiments of the present disclosure, a plurality of battery modules may be electrically connected to each other by arranging the plurality of battery modules through a coupling structure of a coupling protrusion and a guide groove of a module housing, without separate additional members. Therefore, it is possible to effectively reduce the cost and time required for connection, expansion, and installation of the plurality of battery modules of the present disclosure.

Furthermore, according to at least one of the embodiments of the present disclosure, a first current collecting plate and a second current collecting plate are connected in contact with each other only by connecting a plurality of battery modules so as to be adjacent to each other. Therefore, upon connection, expansion, and installation of the battery modules, the electrical connection between the battery modules may be easily performed, thereby effectively reducing the cost and time required for installing the battery pack.

According to at least one of the embodiments of the present disclosure, a contact area between a bus bar and a heat conduction pad may be effectively increased by contacting the bus bar to not only the bottom but also the side of a contact protrusion portion of the heat conduction pad, thereby increasing the heat dissipation efficiency of a battery module.

Furthermore, according to at least one of the embodiments of the present disclosure, since an insertion groove formed in a lower surface of a main body portion of a heat conduction pad accommodates a plate connection portion therein, a contact area between a bus bar and the heat conduction pad is effectively increased, thereby enhancing the cooling efficiency of a battery module.

According to at least one of the embodiments of the present disclosure, a structure in which a protrusion structure of a heat sink is inserted into an accommodation groove of a heat conduction pad may effectively conduct heat of the heat conduction pad to the heat sink, thereby further enhancing the cooling efficiency of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
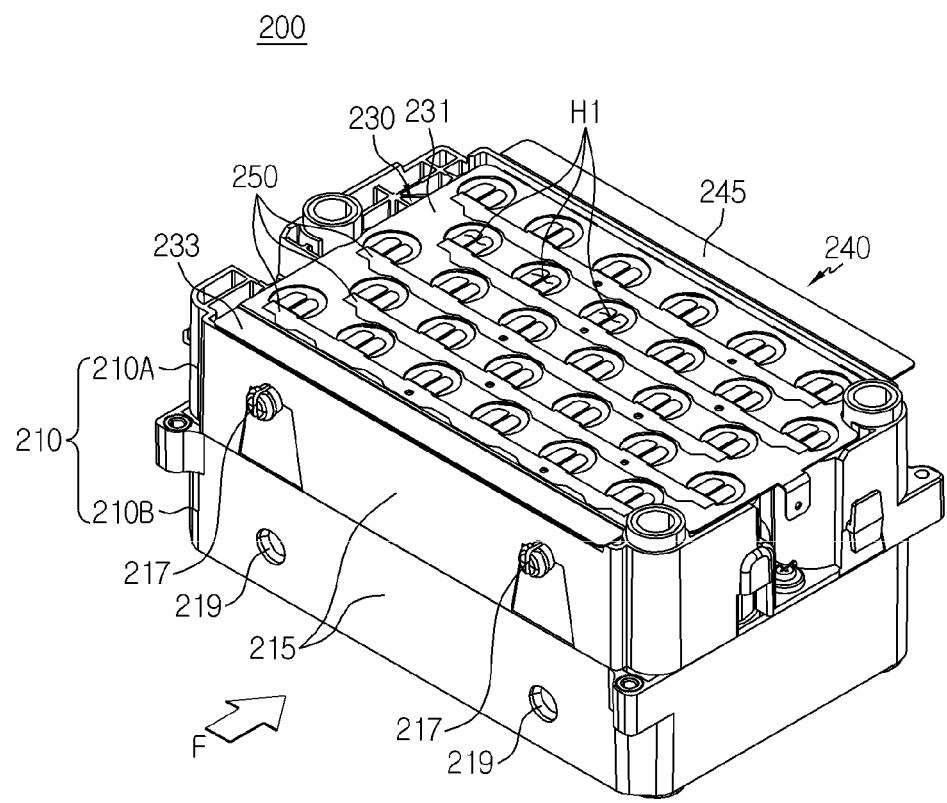
FIG. 1 is a perspective view schematically illustrating a battery module according to an embodiment of the present disclosure.
Figure 2:
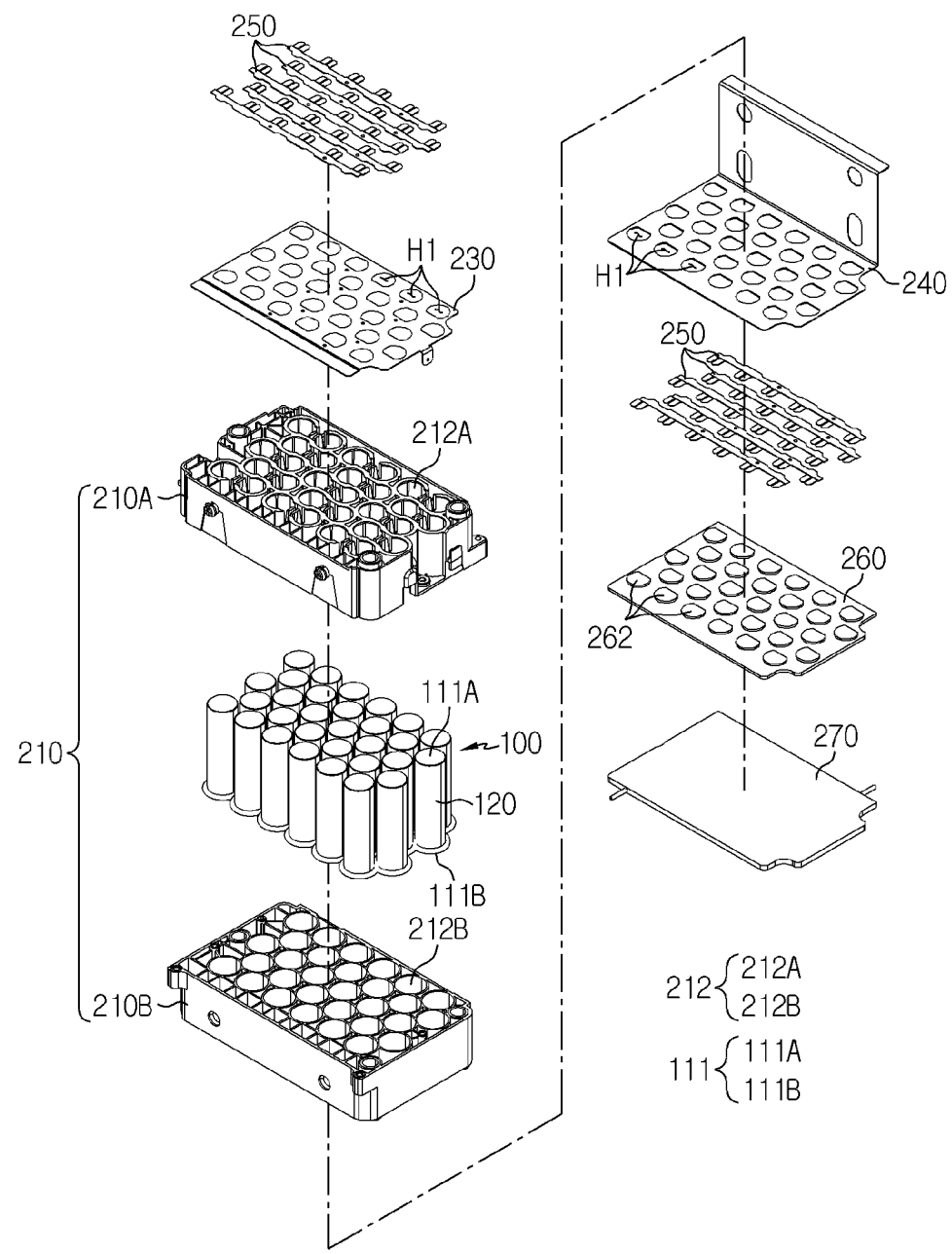
FIG. 2 is an exploded perspective view illustrating various components of a battery module, according to an embodiment of the present disclosure.

FIG. 1 is a perspective view schematically illustrating a battery module according to an embodiment of the present disclosure. FIG. 2 is an exploded perspective view illustrating various components of the battery module, according to an embodiment of the present disclosure.

Referring to FIGS. 1 and 2, a battery module 200 according to the present disclosure may include a plurality of cylindrical battery cells 100, a module housing 210, current collecting plates 230 and 240, a bus bar 250, and a heat conduction pad 260.

Here, the cylindrical battery cells 100 may include a cylindrical battery can 120 and an electrode assembly (not illustrated) accommodated in the battery can 120.

Here, the battery can 120 includes a material having high electrical conductivity. For example, the battery can 120 may include aluminum, steel, or copper. In addition, electrode terminals 111 may be formed on the upper and lower portions of the battery can 120, respectively. Specifically, the electrode terminals 111 may include a first electrode terminal 111A and a second electrode terminal 111B having different electrical polarities. In addition, the first electrode terminal 111A may be formed on a circular upper surface of an upper end of the battery can 120. The second electrode terminal 111B may be formed on a circular lower surface of a lower end of the battery can 120.

Furthermore, the electrode assembly (not illustrated) may be formed in a structure of a jelly-roll winding type with a separator interposed between a positive electrode and a negative electrode. A positive electrode tab may be attached to the positive electrode (not illustrated) and connected to the first electrode terminal 111A at the upper end of the battery can 120. A negative electrode tab may be attached to the negative electrode (not illustrated) and connected to the second electrode terminal 111B at the lower end of the battery can 120.

Meanwhile, the module housing 210 may include an accommodation portion 212 for accommodating the cylindrical battery cells 100 by inserting the cylindrical battery cells 100 thereinto. Specifically, the accommodation portion 212 may have a plurality of hollow structures formed so as to cover the outer surfaces of the cylindrical battery cells 100. In addition, the module housing 210 may include an electrically insulating material such as plastic. The insulating material may be configured to provide electrical insulation between the plurality of cylindrical battery cells 100 accommodated in the accommodation portion 212.

More specifically, the module housing 210 may include an upper case 210A and a lower case 210B coupled to a lower portion of the upper case 210A.

The upper case 210A may include a first accommodation portion 212A formed to have a hollow structure so as to cover the outer surface of the upper portion of the cylindrical battery cell 100.

Furthermore, the lower case 210B may include a second accommodation portion 212B that is coupled to the upper case 210A and formed in a hollow structure so as to surround the lower outer surface of the cylindrical battery cell 100.

Therefore, according to such a configuration of the present disclosure, the module housing 210 may surround and accommodate the upper and lower outer surfaces of the cylindrical battery cells 100 by using the first accommodation portion 212A and the second accommodation portion 212B, thereby stably protecting the accommodated battery cells from external impact.

In addition, the module housing 210 may have an outer wall 215 that defines an inner space and is formed in the front, rear, left, and right directions.

The outer wall 215 of the module housing 210 is provided with a coupling protrusion 217 for guiding an arrangement position of another battery module 200 and a guide groove 219 recessed inward so that the coupling protrusion 217 is inserted thereinto.

Therefore, according to such a configuration of the present disclosure, the battery module 200 may be provided so that another battery module (201 in FIG. 13) is easily arranged at a correct position in one battery module 200 through the coupling protrusion 217 and the guide groove 219 of the module housing 210, without separate additional members. Therefore, it is possible to effectively reduce the cost and time required for connection, expansion, and installation of the plurality of battery modules 200 of the present disclosure.

Meanwhile, the current collecting plates may be a first current collecting plate 230 and a second current collecting plate 240.

Specifically, the first current collecting plate 230 may include an electrically conductive material. For example, the electrically conductive material may be a copper alloy, an aluminum alloy, or the like.

In addition, the first current collecting plate 230 may contact the bus bar 250, of which at least a part of the outer surface is electrically connected to the first electrode terminal 111A of the cylindrical battery cell 100, and may be electrically connected to the cylindrical battery cell 100. In other words, the first current collecting plate 230 may be mounted above the module housing 210 and electrically connected to the first electrode terminal 111A of the cylindrical battery cell 100. At this time, one surface of the first current collecting plate 230 and the other surface of the bus bar 250 may be welded by laser and coupled to each other.

More specifically, the first current collecting plate 230 may be mounted on the upper surface of the module housing 210 and may include a first current collecting portion 231 and a contact accommodation portion 233. Here, the first current collecting portion 231 may be configured to contact the upper surface or the lower surface of the bus bar 250 that is connected in contact with the first electrode terminal 111A of the cylindrical battery cell 100. In addition, a plurality of welding holes H1 may be formed in the first current collecting portion 231 so that the electrode terminals 111 of the cylindrical battery cells 100 are exposed to the outside.

Furthermore, the contact accommodation portion 233 may be formed so that at least a part of one end of the first current collecting portion 231 extends forward. In order to further reduce electrical resistance, for example, as illustrated in FIG. 1, the contact accommodation portion 233 may be formed so that the entire one end of the first current collecting portion 231 extends forward.

Figure 3:
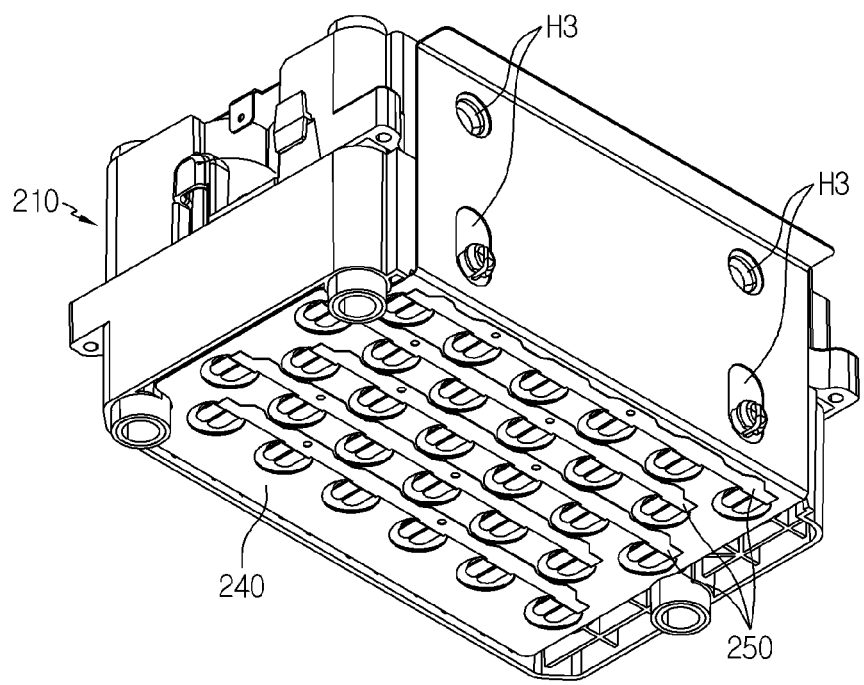
FIG. 3 is a bottom perspective view schematically illustrating a lower portion of some components of a battery module, according to an embodiment of the present disclosure.
Figure 4:
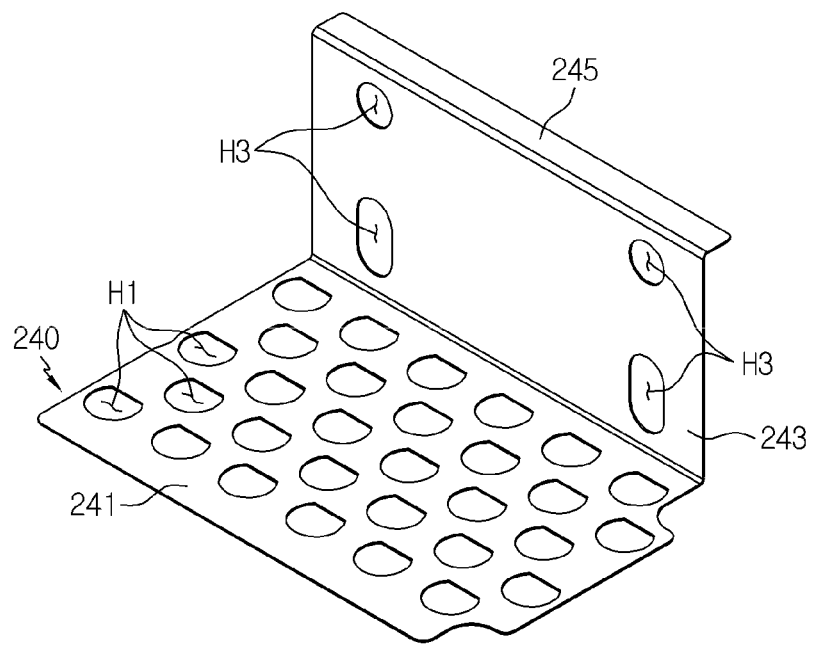
FIG. 4 is a perspective view schematically illustrating a second current collecting plate as a part of a battery module, according to an embodiment of the present disclosure.

FIG. 3 is a bottom perspective view schematically illustrating a lower portion of some components of the battery module, according to an embodiment of the present disclosure. FIG. 4 is a perspective view schematically illustrating the second current collecting plate as a part of the battery module, according to an embodiment of the present disclosure.

Referring to FIGS. 2, 3, and 4, the second current collecting plate 240 may contact the bus bar 250, of which at least a part of the outer surface is electrically connected to the second electrode terminal 111B of the cylindrical battery cell 100, and may be electrically connected to the cylindrical battery cell 100.

Here, the second current collecting plate 240 may include an electrically conductive material. For example, the electrically conductive material may be copper, aluminum, or the like.

In other words, the second current collecting plate 240 may be mounted below the module housing 210 and electrically connected to the second electrode terminal 111B of the cylindrical battery cell 100. At this time, one surface of the second current collecting plate 240 and the other surface of the bus bar 250 may be welded by laser and coupled to each other.

More specifically, the second current collecting plate 240 may include a second current collecting portion 241, a vertical extension portion 243, and a contact connection portion 245.

Here, the second current collecting portion 241 may be formed so as to contact the bus bar 250 that is connected in contact with the second electrode terminal 111B of the cylindrical battery cell 100. More specifically, a plurality of welding holes H1 may be formed in the second current collecting portion 241 so that the electrode terminals 111B of the cylindrical battery cells 100 are exposed to the outside.

In addition, the vertical extension portion 243 may be bent vertically and extended upward from one end of the plate-shaped second current collecting portion 241.

Through-holes H3 may be formed in the vertical extension portion 243 at positions corresponding to the coupling protrusions 217 so that the coupling protrusions 217 pass therethrough. For example, as illustrated in FIG. 4, four through-holes H3 may be formed in the vertical extension portion 243.

The contact connection portion 245 may be bent rearward and extended from the upper end of the vertical extension portion 243 so that the contact connection portion 245 is mounted on the contact accommodation portion 233 of the first current collecting plate 230 and electrically connected to the first current collecting plate 230.

Furthermore, the plurality of battery modules 200 may be connected to each other by coupling the coupling protrusions 217 and the guide grooves 219 to each other. At this time, the first current collecting plate 230 and the second current collecting plate 240 may be in contact with each other.

Therefore, according to such a configuration of the present disclosure, the first current collecting plate 230 and the second current collecting plate 240 are brought into contact with each other even when the plurality of battery modules 200 are coupled to each other, thereby easily performing the connection, expansion, and installation of the battery modules 200.

Figure 5:
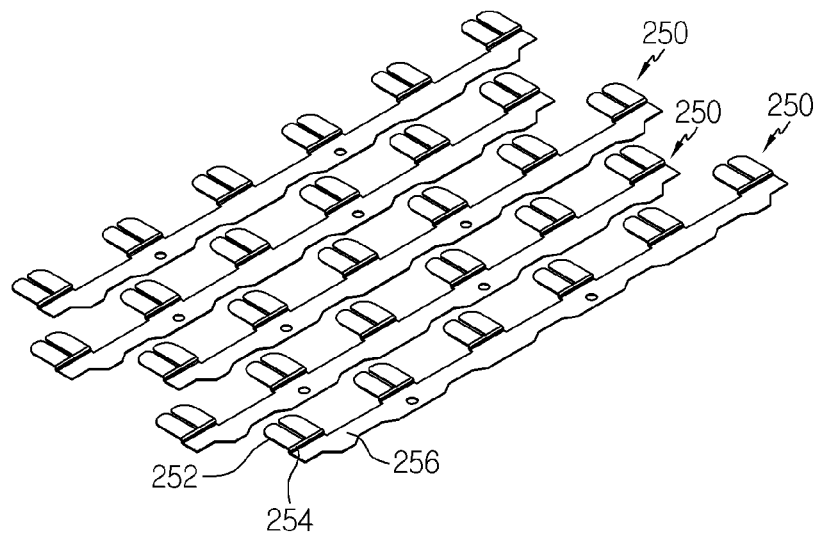
FIG. 5 is a perspective view schematically illustrating a bus bar as a part of a battery module, according to an embodiment of the present disclosure.

FIG. 5 is a perspective view schematically illustrating the bus bar as a part of the battery module, according to an embodiment of the present disclosure.

Referring to FIGS. 2 and 5, the bus bar 250 may be configured to electrically contact the first electrode terminal 111A and the first current collecting plate 230 so as to electrically connect the first electrode terminal 111A to the first current collecting plate 230.

In addition, the bus bar 250 may be configured to electrically contact the second electrode terminal 111B and the second current collecting plate 240 so as to electrically connect the second electrode terminal 111B to the second current collecting plate 240.

Specifically, the bus bar 250 may include an electrically conductive material, for example, a nickel material.

In addition, the bus bar 250 may include a terminal connection portion 252, a vertical extension portion 254, and a plate connection portion 256.

Specifically, the terminal connection portion 252 may have a plate shape corresponding to the outer surface of the electrode terminal 111 so as to be connected in contact with the electrode terminal 111 of the cylindrical battery cell 100. More specifically, the terminal connection portion 252 may have a structure in which the terminal connection portion 252 protrudes and extends forward from the plate connection portion 256, when viewed in an F direction.

Meanwhile, in the present specification, the upward, downward, forward, backward, leftward, and rightward directions are based on the direction when viewed in the F direction, unless otherwise specified.

Furthermore, the vertical extension portion 254 may be a portion that connects the terminal connection portion 252 and the plate connection portion 256. Specifically, the vertical extension portion 254 may extend upward or downward from the terminal connection portion 252 and may be connected to the plate connection portion 256. That is, the vertical extension portion 254 may extend upward so as to penetrate through the welding hole H1 of the first current collecting plate 230. Alternatively, the vertical extension portion 254 may extend downward so as to penetrate through the welding hole H1 of the second current collecting plate 240.

The plate connection portion 256 may be bent and extended in the horizontal direction from the end of the vertical extension portion 254 so as to be in contact with the outer surface of the first current collecting plate 230 or the second current collecting plate 240.

Furthermore, the bus bar 250 may have a structure in which the plate connection portion 256 and the terminal connection portion 252 have a height difference. That is, the bus bar 250 may have a stepped structure that has a height difference in the vertical direction.

For example, as illustrated in FIG. 1, five bus bars 250 that electrically connect the first electrode terminals 111A of 30 cylindrical battery cells 100 in parallel in one direction may be constructed. Similarly, as illustrated in FIG. 3, five bus bars 250 that electrically connect the second electrode terminals 111B of 30 cylindrical battery cells 100 in parallel in one direction G may be constructed.

Figure 6:
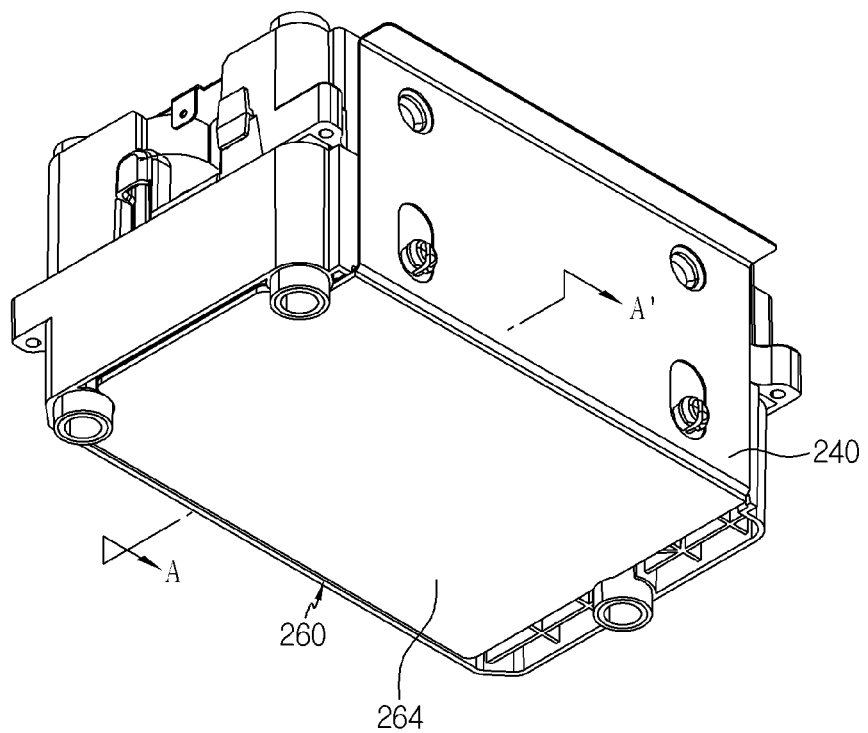
FIG. 6 is a bottom perspective view schematically illustrating a lower portion of a battery module, according to an embodiment of the present disclosure.

In addition, the terminal connection portion 252 may include a structure that is branched in two and protrudes in the horizontal direction. Therefore, according to such a configuration of the present disclosure, since the structure that is branched in two in the left or right direction is formed at the central portion of the terminal connection portion 252 requiring melting bonding in welding, the separated gap of the terminal connection portion 252 generates high electrical resistance during resistance welding heating. Thus, as rapid heating is performed, the welding time can be shortened and the welding reliability can be improved. FIG. 6 is a bottom perspective view schematically illustrating the lower portion of the battery module, according to an embodiment of the present disclosure.

Referring to FIGS. 2 and 6, the heat conduction pad 260 of the battery module 200 may be disposed outside the first current collecting plate 230 or the second current collecting plate 240. In addition, the heat conduction pad 260 may include the electrically insulating material. The heat conduction pad 260 may include a material having excellent thermal conductivity. For example, the heat conduction pad 260 may include a silicon-based material. Here, the silicon-based material may be a silicon-based polymer resin. Alternatively, the heat conduction pad 260 may include at least part of a polysiloxane resin, a polyamide resin, a urethane resin, or an epoxy resin.

More specifically, the heat conduction pad 260 may be disposed on the upper surface of the first current collecting plate 230 or the lower surface of the second current collecting plate 240. In addition, the heat conduction pad 260 may extend from one side of the second current collecting plate 240 in the horizontal direction to the other side thereof.

Furthermore, when internal gas is generated in the upper end of the cylindrical battery cell 100 at a specific internal pressure or higher, a safety vent structure (not illustrated) for discharging gas to the outside may be formed. Therefore, when the heat conduction pad 260 is positioned on the upper surface of the first current collecting plate 230 disposed above the cylindrical battery cell 100, pores or outlets may be formed in the heat conduction pad 260 so that gas discharged through the safety vent structure formed in the first electrode terminal 111A is smoothly discharged to the outside.

In contrast, when the safety vent structure is not formed at the lower end of the cylindrical battery cell 100, the heat conduction pad 260 is positioned on the lower surface of the second current collecting plate 240 disposed below the cylindrical battery cell 100. Therefore, the bus bar 250 and the second current collecting plate 240 can be effectively cooled without interrupting the discharge of gas from the cylindrical battery cell 100.

For example, as illustrated in FIG. 6, the heat conduction pad 260 may be disposed in close contact with the lower surface of the second current collecting plate 240.

Therefore, according to such a configuration of the present disclosure, the heat conduction pad 260 is positioned on the upper surface of the first current collecting plate 230 or the lower surface of the second current collecting plate 240, thereby effectively dissipating heat generated from the first current collecting plate 230, the second current collecting plate 240, and the bus bar 250.

Figure 7:
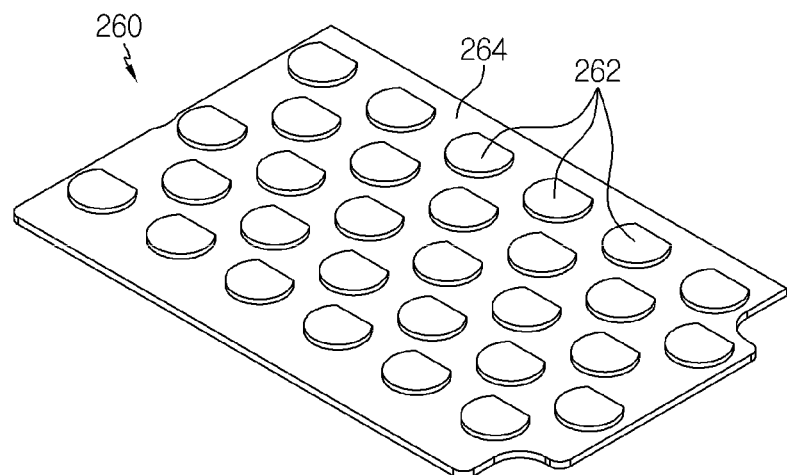
FIG. 7 is a perspective view schematically illustrating a heat conduction pad as a part of a battery module, according to an embodiment of the present disclosure.
Figure 8:
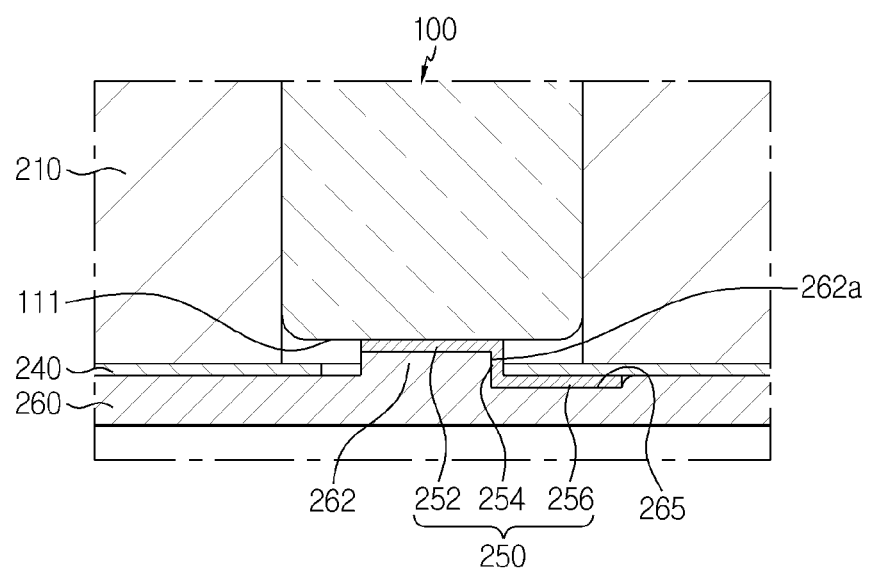
FIG. 8 is a partial cross-sectional view schematically illustrating some components of a battery module, taken along line A-A' in FIG. 6.

FIG. 7 is a perspective view schematically illustrating the heat conduction pad as a part of the battery module, according to an embodiment of the present disclosure. FIG. 8 is a partial cross-sectional view schematically illustrating some components of a battery module, taken along line A-A' in FIG. 6.

Referring to FIGS. 7 and 8, the heat conduction pad 260 may include a contact protrusion portion 262 protruding and extending in a direction in which the electrode terminal 111 is disposed. Specifically, the contact protrusion portion 262 may protrude so as to be in contact with a contact connection portion between the electrode terminal 111 and the bus bar 250.

The contact protrusion portion 262 may be formed in number and size enough to be inserted into the plurality of welding holes H1 formed in the first current collecting plate 230 or the second current collecting plate 240. Furthermore, the protruding inner surface of the contact protrusion portion 262 may have a shape corresponding to the contact connection portion between the electrode terminal 111 and the bus bar 250.

For example, as illustrated in FIG. 7, 30 contact protrusion portions 262 may be formed in the heat conduction pad 260. Each of the 30 contact protrusion portions 262 may have a protrusion size enough to be in contact with the contact connection portion between the electrode terminal 111 and the bus bar 250.

Referring to 5 and 8 again, the surface of the contact protrusion portion 262 may be in contact with the plate-shaped outer surface of the terminal connection portion 252. That is, the outer surface of the contact protrusion portion 262 in the protruding direction may be in contact with the outer surface of the terminal connection portion 252.

For example, as illustrated in FIG. 8, one contact protrusion portion 262 of the heat conduction pad 260 may protrude so as to be in contact with the terminal connection portion 252 formed in the bus bar 250.

In this case, the electrode terminal 111 of the cylindrical battery cell 100 and the terminal connection portion 252 of the bus bar 250 are welded to each other. In the case of bonding with heterogeneous materials between the electrode terminal 111 made of a steel material and the bus bar 250 made of a nickel material, a large resistance may easily occur due to energization and high temperatures may be generated.

Therefore, according to such a configuration of the present disclosure, the heat conduction pad 260 includes the contact protrusion portion 262 configured to be in contact with the outer surface of the terminal connection portion 252 so as to cool the terminal connection portion 252 of the bus bar 250 having a relatively high electrical resistance in the battery module 200, thereby effectively enhancing the cooling effect of the battery module 200.

Furthermore, a horizontal side portion 262a of the contact protrusion portion 262 may be configured so as to be in contact with the vertical extension portion 254 of the bus bar 250. That is, a horizontal side surface of the vertical extension portion 254 of the bus bar 250 and a horizontal side portion 262a of the contact protrusion portion 262 may be in contact with each other.

Therefore, according to such a configuration of the present invention, since the bus bar 250 electrically connects the first current collecting plate 230 or the second current collecting plate 240 and the electrode terminal 111 of the cylindrical battery cell 100, the bus bar 250 is a member in which the amount of heat generated during the operation of the battery module 200 increases rapidly. Thus, as the contact area between the bus bar 250 and the heat conduction pad 260 is wider, the heat dissipation effect may be enhanced. Accordingly, the heat dissipation effect of the battery module 200 may be further enhanced by bringing the bus bar 250 into contact with the side of the contact protrusion portion 262 as well as the bottom of the contact protrusion portion 262.

Furthermore, the heat conduction pad 260 may include a main body portion 264 disposed outside the first current collecting plate 230 or the second current collecting plate 240.

Specifically, the main body portion 264 may extend along the outer surface of the first current collecting plate 230 or the second current collecting plate 240, and the inner surface of the main body portion 264 may be in contact with the plate connection portion 256. That is, the main body portion 264 may be positioned on the outer surface of the first current collecting plate 230 or the second current collecting plate 240, and may be configured to absorb heat generated in the first current collecting plate 230 or the second current collecting plate 240.

In addition, an insertion groove 265 recessed inward in the outward direction may be formed on the inner surface of the main body portion 264 of the heat conduction pad 260 so that the plate connection portion 256 of the bus bar 250 is inserted thereinto. Furthermore, the insertion groove 265 may have a structure that is recessed inward in a shape corresponding to the outer shape of the plate connection portion 256. That is, the inner surface of the insertion groove 265 may be brought in close contact with the outer surface of the plate connection portion 256.

In this case, the electrode terminal 111 of the cylindrical battery cell 100 and the plate connection portion 256 of the bus bar 250 are welded to each other. In the case of bonding with heterogeneous materials between the first current collecting plate 230 and the second current collecting plate 240 made of a copper material and the bus bar 250 made of a nickel material, a large resistance may easily occur due to energization and high temperatures may be generated.

Therefore, according to such a configuration of the present disclosure, since the insertion groove 265 formed in the lower surface of the main body portion 264 of the heat conduction pad 260 accommodates the plate connection portion 256 therein, the contact area between the bus bar 250 and the heat conduction pad 260 may be increased, and the thermal conductivity of the heat conduction pad 260 may be effectively increased. Ultimately, the cooling effect of the battery module 200 may be enhanced.

Figure 9:
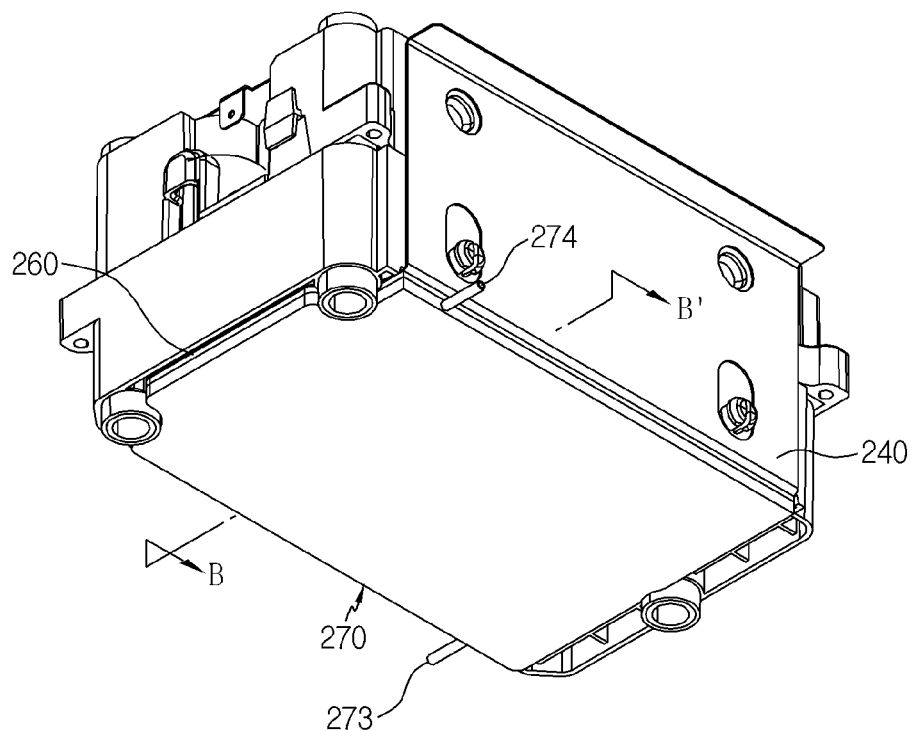
FIG. 9 is a bottom perspective view schematically illustrating a lower portion of some components of a battery module, according to another embodiment of the present disclosure.
Figure 10:
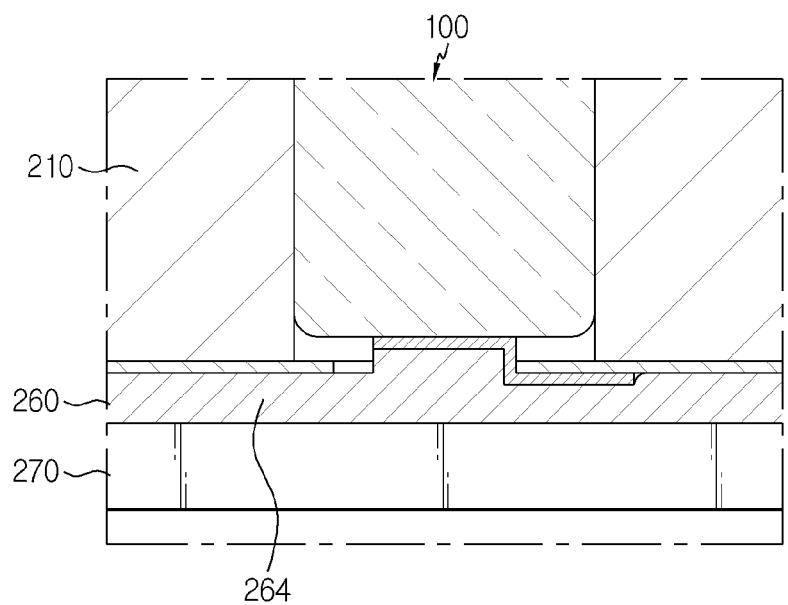
FIG. 10 is a partial cross-sectional view schematically illustrating some components of a battery module, taken along line B-B' in FIG. 9.

FIG. 9 is a bottom perspective view schematically illustrating a lower portion of some components of a battery module, according to another embodiment of the present disclosure. FIG. 10 is a partial cross-sectional view schematically illustrating some components of the battery module, taken along line B-B' in FIG. 9.

Referring to FIGS. 9 and 10, the battery module 200B may further include a heat sink 270 for enhancing the heat dissipation effect of the heat conduction pad 260.

Specifically, as those having the same or similar concept as the general heat sink 270, a cooling passage (not illustrated) may be formed in the heat sink 270, and a coolant inlet pipe 273 and a coolant outlet pipe 274 may be formed at both ends of the heat sink 270. That is, when the coolant flows into the coolant inlet pipe 273, the heat of the heat conduction pad 260 is conducted to the coolant while the coolant circulates along the cooling passage formed in the heat sink 270, and the heated coolant may flow out through the coolant outlet pipe 274.

In addition, at least part of the outer wall of the heat sink 270 may include a material having high thermal conductivity. For example, the material having high thermal conductivity may be aluminum or copper.

Furthermore, the heat sink 270 may be positioned so as to be in contact with the outer surface of the main body portion 264 of the heat conduction pad 260. The heat sink 270 may have an inner surface having a shape corresponding to the outer surface of the main body portion 264 of the heat conduction pad 260. That is, the heat sink 270 may have an inner surface so as to be in close contact with the outer surface of the heat conduction pad 260, so that the heat of the heat conduction pad 260 is effectively conducted.

Figure 11:
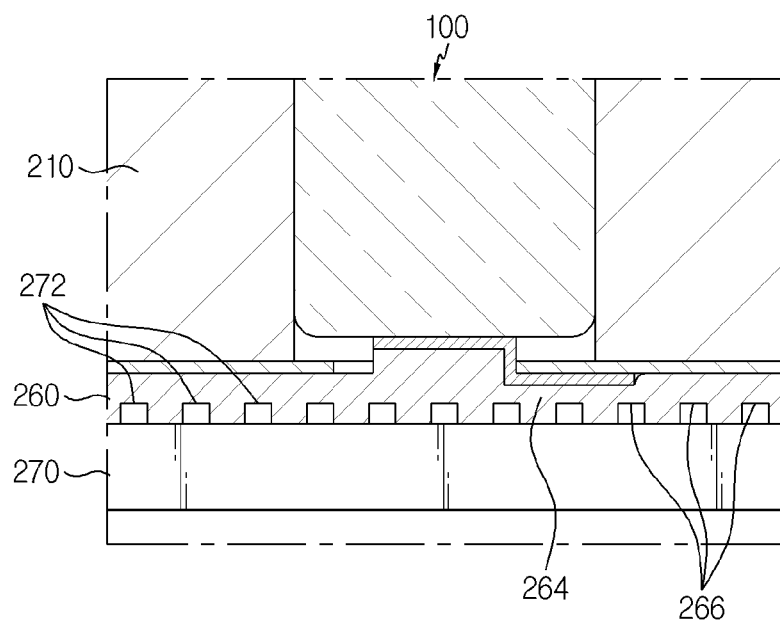
FIG. 11 is a partial cross-sectional view schematically illustrating some components of a battery module, according to another embodiment of the present disclosure.

FIG. 11 is a partial cross-sectional view schematically illustrating some components of a battery module, according to another embodiment of the present disclosure.

Referring to FIG. 11, a plurality of protrusion structures 272 may be formed on the outer surface of the heat sink 270. In addition, the protrusion structure 272 may be formed so as to increase the contact area of the heat sink 270 with outside air.

Alternatively, the protrusion structure 272 may protrude from the inner surface of the heat sink 270 in a direction in which the heat conduction pad 260 is disposed. A plurality of accommodation grooves 266 into which the protrusion structures 272 are inserted may be formed on the outer surface of the main body portion 264 of the heat conduction pad 260.

For example, as illustrated in FIG. 11, the heat sink 270 may be provided with a plurality of protrusion structures 272 spaced apart from each other by a predetermined distance. In addition, the plurality of protrusion structures 272 may be respectively inserted into the plurality of accommodation grooves 266 formed on the outer surface of the main body portion 264 of the heat conduction pad 260.

Therefore, according to such a configuration of the present invention, due to the structure in which the protrusion structures 272 of the heat sink 270 are inserted into the accommodation grooves 266 of the heat conduction pad 260, the heat of the heat conduction pad 260 may be effectively conducted to the heat sink 270, thereby further enhancing the cooling efficiency of the battery module 200.

Figure 12:
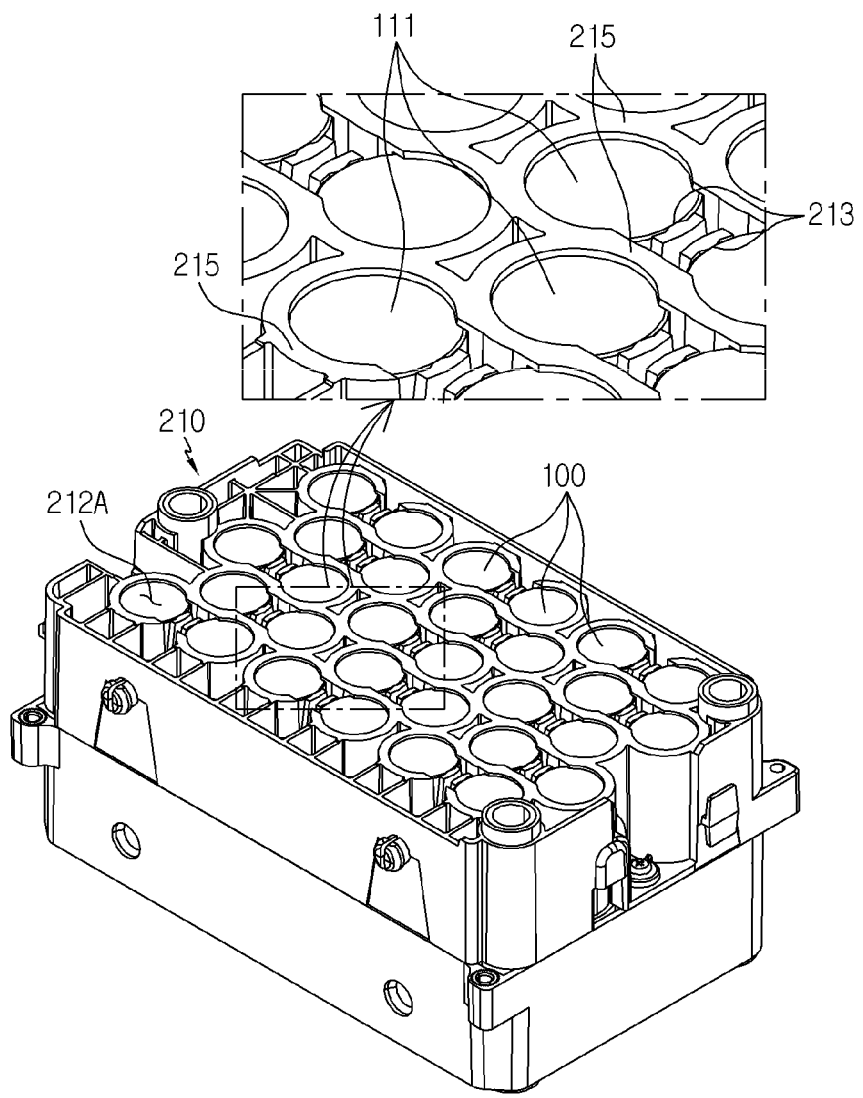
FIG. 12 is a perspective view and a partial enlarged view schematically illustrating some components of a battery module, according to an embodiment of the present disclosure.

FIG. 12 is a perspective view and a partial enlarged view schematically illustrating some components of a battery module, according to an embodiment of the present disclosure.

Referring to FIGS. 2 and 12, a cover structure 215 protruding and extending in a direction in which the electrode terminal 111 of the cylindrical battery cell 100 is disposed may be formed in the accommodation portion 212 of the module housing 210. Specifically, the cover structure 215 may be formed at the upper end or the lower end of the accommodation portion 212 so as to cover the outer peripheral portion of the upper end surface or the lower end surface of the cylindrical battery cell 100.

For example, as illustrated in FIG. 12, the cover structure 215 may be formed at the upper end of the first accommodation portion 212A so as to prevent the upper end of the cylindrical battery cell 100 from moving to the upper portion of the first accommodation portion 212A.

Specifically, the cover structure 215 may be an arc-shaped structure that has a diameter narrower than an upper diameter of the cylindrical battery cell 100, and the cover structure 215 may be an arc-shaped structure that protrudes from the upper end of the hollow structure of the first accommodation portion 212A in the direction of the central axis.

Furthermore, a cover structure (not illustrated) of the lower case 210B may be formed at the lower end of the second accommodation portion 212B so as to prevent the lower end of the cylindrical battery cell 100 from moving to the upper portion of the second accommodation portion 212B. The cylindrical battery cell 100 may be fixed in a shape similar to the cover structure 215 formed in the upper case 210A.

Therefore, according to such a configuration of the present invention, the cylindrical battery cell 100 accommodated in the module housing 210 may be effectively prevented from being released to the outside by the cover structure 215, and the movement is restricted in the upward direction to prevent the flow thereof, thereby preventing damage such as electrical disconnection from the bus bar 250.

In addition, a fixing structure for pressing and fixing the side surface of the cylindrical battery cell 100 may be formed at the upper end portion or the lower end portion of the accommodation portion 212 where the cover structure 215 is not formed.

Specifically, the fixing structure may include a convex portion 213 protruding from the inner surface of the first accommodation portion 212A in the horizontal direction (inward direction) in which the cylindrical battery cell 100 is disposed, so as to press the outer surface of the cylindrical battery cell 100.

Therefore, according to such a configuration of the present disclosure, since the convex portion 213 can press and fix one side surface of the cylindrical battery cell 100, it is possible to reduce damage or disconnection of the connection structure between the cylindrical battery cell 100 and the bus bar 250 due to vibration or flow caused by external impact.

Figure 13:
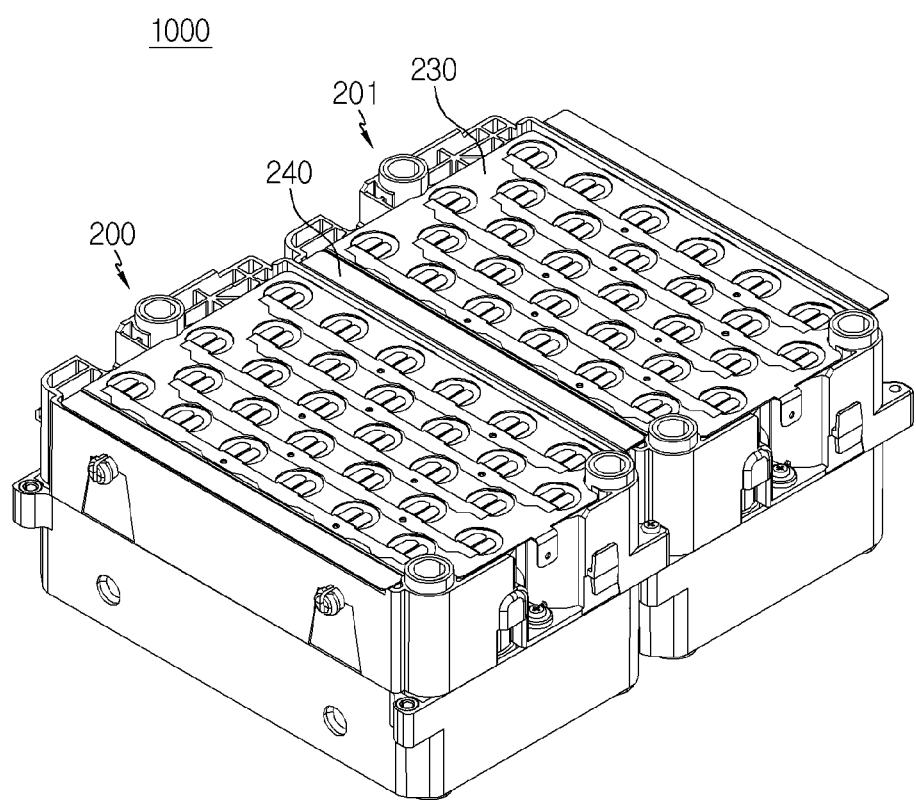
FIG. 13 is a perspective view schematically illustrating a battery pack in which battery modules according to an embodiment of the present disclosure are connected to each other.

FIG. 13 is a perspective view schematically illustrating a battery pack in which battery modules according to an embodiment of the present disclosure are connected to each other.

Referring to FIGS. 1, 4, and 13, a battery pack 1000 according to the present disclosure may include at least one battery module 200 according to the present disclosure. In addition, the battery pack 1000 according to the present disclosure may further include, in addition to the battery module 200, a pack case for accommodating the battery module 200, and various devices for controlling charge and discharge of the battery module 200, such as a battery management system (BMS), a current sensor, and a fuse.

For example, as illustrated in FIG. 13, the battery pack 1000 may include two battery modules 200 and 201. Furthermore, one battery module 200 may be electrically connected to the other battery module 201.

Specifically, the second current collecting plate 240 of one battery module 200 and the first current collecting plate 230 of the other battery module 201 may be disposed in contact with each other so as to be electrically connected to each other. That is, the contact connection portion 245 of the second current collecting plate 240 may be mounted on the contact accommodation portion 233 of the first current collecting plate 230 and electrically connected to the first current collecting plate 230.

In addition, the battery pack 1000 according to the present invention may be applied to a device such as an energy storage device. That is, the device according to the present disclosure may include the battery pack 1000 according to the present disclosure.

For example, the battery pack may be applied to an energy storage system including a control unit that can be used as an electric power source in an emergency. That is, the energy storage system according to the present disclosure may include the battery pack 1000 according to the present disclosure.

In the present specification, although the terms indicating directions such as up, down, left, right, front, and rear are used, it will be apparent to those skilled in the art that these terms are only for convenience of description and may vary depending on the location of the object or the location of the observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

LIST OF REFERENCE NUMERALS

1000: Battery pack
100: Cylindrical battery cell
200: Battery module
111: Electrode terminal
230: First current collecting plate
240: Second current collecting plate
H1: Welding hole
250: Bus bar
252: Terminal connection portion
254: Vertical extension portion
256: Plate connection portion
210: Module housing
260: Heat conduction pad
262: Contact protrusion portion
264: Main body portion
270: Heat sink
215: Cover structure
265: Insertion groove
272: Protrusion structure
266: Accommodation groove
217: Coupling protrusion
219: Guide groove

What is claimed is:

1. A battery module comprising:
    a plurality of cylindrical battery cells, each having electrode terminals respectively formed at an upper portion and a lower portion thereof;
    a module housing comprising an accommodation portion having a plurality of hollow structures in which the plurality of cylindrical battery cells are accommodated;
    a current collecting plate on an outer surface of the module housing and comprising a plurality of welding holes, such that each of the electrode terminals of the cylindrical battery cells are exposed to the outside through a respective one of the welding holes;
    a bus bar in contact with an outer surface of the current collecting plate, such that respective bus bar contact portions are disposed into respective ones of the welding holes to be in contact with respective ones of the electrode terminals to electrically connect the electrode terminals to the current collecting plate; and
    a heat conduction pad disposed outside the current collecting plate and comprising contact protrusion portions protruding and extending in a direction in which the electrode terminals are disposed, such that each contact protrusion portion is inserted into and disposed in a respective welding hole of the current collecting plate to be in direct contact with a respective bus bar contact portion,
    wherein the respective bus bar contact portion is between the respective electrode terminal and the respective contact protrusion portion.

2. The battery module of claim 1, wherein each bus bar contact portion comprises:
    a terminal connection portion having a plate shape corresponding to an outer surface of the electrode terminal to be connected in contact with the electrode terminal of the cylindrical battery cell;
    a vertical extension portion extending upward or downward from the terminal connection portion to penetrate through the welding hole of the current collecting plate; and a plate connection portion bent and extended from an end of the vertical extension portion in a horizontal direction to be in contact with an outer surface of the current collecting plate.

3. The battery module of claim 2, wherein a surface of the contact protrusion portion is in contact with a plate-shaped outer surface of the terminal connection portion.

4. The battery module of claim 2, wherein a horizontal side portion of the contact protrusion portion is in contact with the vertical extension portion of the bus bar.

5. The battery module of claim 2, wherein the heat conduction pad comprises a main body portion disposed outside the current collecting plate and extending along the outer surface of the current collecting plate, an inner surface of the main body portion being in contact with the plate connection portion.

6. The battery module of claim 5, wherein an inner side surface of the main body portion of the heat conduction pad comprises an insertion groove that is recessed and in which the plate connection portion of the bus bar is inserted.

7. The battery module of claim 5, further comprising a heat sink disposed to be in contact with an outer surface of the main body portion of the heat conduction pad.

8. The battery module of claim 7, wherein a plurality of protrusion structures protruding in a direction in which the heat conduction pad is disposed are formed on an inner surface of the heat sink, and
wherein a plurality of accommodation grooves into which the plurality of protrusions structures are inserted are formed on the outer surface of the main body portion of the heat conduction pad.

9. The battery module of claim 2, wherein the accommodation portion comprises a cover structure protruding and extending in a direction in which the electrode terminals of the cylindrical battery cells are disposed, to cover an outer peripheral portion of an upper end surface or a lower end surface of the cylindrical battery cell.

10. A battery pack, comprising:
at least one battery module of claim 1; and
a pack case configured to accommodate the at least one battery module.

11. A device, comprising:
the battery pack of claim 10; and
a control unit configured to control the battery pack to be used as an electric power source.

* * * * *